(12) United States Patent
Zhao

(10) Patent No.: US 11,889,133 B2
(45) Date of Patent: Jan. 30, 2024

(54) BURST TRAFFIC PROCESSING METHOD, COMPUTER DEVICE AND READABLE STORAGE MEDIUM

(71) Applicant: SHANGHAI HODE INFORMATION TECHNOLOGY CO., LTD., Shanghai (CN)

(72) Inventor: Hailin Zhao, Shanghai (CN)

(73) Assignee: SHANGHAI HODE INFORMATION TECHNOLOGY CO., LTD., Shanghai (CN)

( * ) Notice: Subject to any disclaimer, the term of this patent is extended or adjusted under 35 U.S.C. 154(b) by 67 days.

(21) Appl. No.: 17/628,444

(22) PCT Filed: Apr. 16, 2020

(86) PCT No.: PCT/CN2020/085058
§ 371 (c)(1),
(2) Date: Jan. 19, 2022

(87) PCT Pub. No.: WO2021/017526
PCT Pub. Date: Feb. 4, 2021

(65) Prior Publication Data
US 2022/0272392 A1 Aug. 25, 2022

(30) Foreign Application Priority Data
Jul. 31, 2019 (CN) .......................... 201910703681.0

(51) Int. Cl.
*H04N 7/173* (2011.01)
*H04N 21/2385* (2011.01)
(Continued)

(52) U.S. Cl.
CPC ....... *H04N 21/2385* (2013.01); *H04L 47/806* (2013.01); *H04N 21/2187* (2013.01);
(Continued)

(58) Field of Classification Search
CPC ........... H04N 21/2385; H04N 21/2187; H04N 21/23406; H04N 21/2393; H04N 21/2407;
(Continued)

(56) References Cited

U.S. PATENT DOCUMENTS

| | | | |
|---|---|---|---|
| 2005/0262245 A1 | 11/2005 | Menon et al. | |
| 2014/0129667 A1* | 5/2014 | Ozawa | H04L 67/1001 709/213 |

(Continued)

FOREIGN PATENT DOCUMENTS

| | | |
|---|---|---|
| CN | 101645928 A | 2/2010 |
| CN | 101645928 B | 7/2012 |

(Continued)

OTHER PUBLICATIONS

European Patent Application No. 20846381.0; Extended Search Report; dated Jul. 26, 2022; 8 pages.

(Continued)

*Primary Examiner* — Gigi L Dubasky
(74) *Attorney, Agent, or Firm* — BakerHostetler

(57) ABSTRACT

The present disclosure describes techniques of processing burst traffic. In the present application, when a service request is received, it is determined whether there is service data corresponding to the service request in a buffer unit. If so, the corresponding service data in the buffer unit is directly sent to a client computer so as to reduce access pressure of a second service layer; if not, determining whether a request frequency associated with the service request is greater than a frequency threshold; when the request frequency of the service request is greater than the frequency threshold, it indicates that the second service layer of the service type corresponding to the service request reaches the upper limit of capacity. In this case, the service (Continued)

request is sent to a first service layer so as to acquire corresponding service data.

17 Claims, 6 Drawing Sheets

(51) Int. Cl.
  *H04L 47/80* (2022.01)
  *H04N 21/2187* (2011.01)
  *H04N 21/234* (2011.01)
  *H04N 21/239* (2011.01)
  *H04N 21/24* (2011.01)

(52) U.S. Cl.
  CPC ... *H04N 21/2393* (2013.01); *H04N 21/23406* (2013.01); *H04N 21/2407* (2013.01)

(58) Field of Classification Search
  CPC . H04L 67/1097; H04L 67/563; H04L 67/564; H04L 67/568; H04L 47/125; H04L 47/20; H04L 47/24; H04L 47/29
  See application file for complete search history.

(56) References Cited

U.S. PATENT DOCUMENTS

| | | | |
|---|---|---|---|
| 2015/0020124 A1* | 1/2015 | Bae | H04N 21/432 725/86 |
| 2015/0178016 A1* | 6/2015 | Lim | G06F 3/0611 711/102 |
| 2018/0041561 A1 | 2/2018 | Davies et al. | |
| 2020/0389541 A1* | 12/2020 | Baldwin | G06F 12/0888 |
| 2021/0144172 A1* | 5/2021 | Wasiq | H04L 63/08 |

FOREIGN PATENT DOCUMENTS

| | | | | |
|---|---|---|---|---|
| CN | 105490955 A | | 4/2016 | |
| CN | 105704246 A | | 6/2016 | |
| CN | 106713388 A | | 5/2017 | |
| CN | 106815364 A | * | 6/2017 | ......... G06F 16/9535 |
| CN | 107197321 A | * | 9/2017 | ......... H04N 21/2187 |
| CN | 108173938 A | | 6/2018 | |
| CN | 108833468 A | | 11/2018 | |
| CN | 109815716 A | | 5/2019 | |

OTHER PUBLICATIONS

International Patent Application No. PCT/CN2020/085058; Int'l Written Opinion and Search Report; dated Jul. 16, 2020; 5 pages.

* cited by examiner

BURST TRAFFIC PROCESSING METHOD, COMPUTER DEVICE AND READABLE STORAGE MEDIUM

CROSS-REFERENCE TO RELATED APPLICATIONS

The present application is the U.S. National Stage of International Application No. PCT/CN2020/085058, filed on Apr. 16, 2020, which claims the priority of the Chinese Patent Application No. 201910703681.0, filed on Jul. 31, 2019 and entitled "Method for processing burst traffic, computer device, and computer-readable storage medium", which is incorporated herein by reference in its entirety.

TECHNICAL FIELD

The present application relates to the technical field of live broadcast applications, and in particular to a burst traffic processing method, computer device and readable storage medium.

BACKGROUND

With the rapid development of the live broadcast industry, various types of emergencies in live broadcast rooms are increasing. Due to the unpredictability of the Internet, traffic limiting and degradation are usually applied to deal with the case of instantaneous burst traffic. However, the inventor has found that traffic limiting and degradation easily cause some users unable to access a live broadcast room, which affects the user experience in watching a live broadcast.

SUMMARY

In view of the existing problem of instantaneous burst traffic, a method for processing burst traffic, a computer device, and a computer-readable storage medium are provided herein, which aim at offloading and caching burst traffic according to a service type and a number of visits to a live broadcast room, so as to ensure user experience.

A method for processing burst traffic is provided, including steps of:

pre-configuring a buffer unit for storing marked service data;

obtaining a service request sent by a client computing device;

determining whether there is service data stored in the buffer unit matching the service request;

when there is service data in the buffer unit matching the service request, sending the service data to the client computing device;

when there is no service data in the buffer unit matching the service request, determining whether a request frequency of the service request is greater than a frequency threshold; and allocating, when the request frequency of the service request is greater than the frequency threshold, resources to a first service layer according to a service type of the service request, sending the service request to the first service layer after allocating the resources to obtain corresponding service data sent by the first service layer, and sending the obtained service data to the client computing device.

Optionally, the first service layer shares storage of service resources by sharing storage.

Optionally, before the step of obtaining a service request sent by the client computing device, the method includes:

monitoring popularity data of a live broadcast room, and marking service data with popularity data greater than a preset popularity threshold by a second service layer.

Optionally, the step of determining whether a request frequency of the service request is greater than a frequency threshold includes:

when the request frequency of the service request is less than or equal to the frequency threshold, requesting service data corresponding to the service request from the second service layer, to obtain the service data sent by the second service layer; and determining whether the service data carries a mark, if the service data carries a mark, storing the service data in the buffer unit and sending the service data to the client computing device, and if the service data does not carry a mark, sending the service data to the client computing device.

Optionally, the step of monitoring popularity data of a live broadcast room, and marking service data with popularity data greater than a preset popularity threshold by a second service layer includes:

monitoring popularity data of each live broadcast room accessed by each CDN node, and determining whether the popularity data of the live broadcast room is greater than the preset popularity threshold; and sending an address of the live broadcast room to the second service layer when the popularity data of the live broadcast room is greater than the preset popularity threshold, and marking the service data associated with the address of the live broadcast room by the second service layer.

Optionally, the step of sending an address of the live broadcast room to the second service layer when the popularity data of the live broadcast room is greater than the preset popularity threshold, and marking the service data associated with the address of the live broadcast room by the second service layer includes:

when the popularity data of the live broadcast room is greater than the preset popularity threshold, obtaining the address of the live broadcast room, and sending the address of the live broadcast room to each service server in the second service layer, and marking the service data associated with the address of the live broadcast room by the service servers.

Optionally, the step of allocating, when the request frequency of the service request is greater than the frequency threshold, resources to a first service layer according to a service type of the service request, sending the service request to the first service layer after allocating the resources to obtain corresponding service data sent by the first service layer, and sending the obtained service data to the client computing device includes:

allocating, when the request frequency of the service request is greater than the frequency threshold, resources to the first service layer according to the service type of the service request; and obtaining, from a list of registered addresses, a service node address corresponding to an offloading identifier of the service request, sending the service request to a service node in the first service layer according to the service node address, to obtain corresponding service data sent by the service node, and sending the service data to the client computing device.

Optionally, the step of allocating, when the request frequency of the service request is greater than the frequency threshold, resources to the first service layer according to the service type of the service request includes:

extracting a service identifier in the service request;

determining whether the request frequency of the service identifier is greater than the frequency threshold;

when the request frequency of the service identifier is greater than the frequency threshold, determining the service identifier as the offloading identifier;

obtaining a list of registered addresses for all service nodes in the first service layer; and allocating resources to a service node corresponding to a registered address in the list of registered addresses according to the service type corresponding to the offloading identifier.

The present application further provides an apparatus for processing burst traffic, including:

a pre-configuration means configured to pre-configure a buffer unit for storing marked service data;

an obtaining means configured to obtain a service request sent by a client computing device;

a first determination means configured to determine whether there is service data stored in the buffer unit matching the service request;

a sending means configured to send, when there is service data in the buffer unit matching the service request, the service data to the client computing device;

a second determination means configured to determine, when there is no service data in the buffer unit matching the service request, whether a request frequency of the service request is greater than a frequency threshold; and an allocation means configured to allocate, when the request frequency of the service request is greater than the frequency threshold, resources to a first service layer according to a service type of the service request, send the service request to the first service layer after allocating the resources to obtain corresponding service data sent by the first service layer, and send the obtained service data to the client computing device.

The present application further provides a computer device including a memory, a processor, and a computer-readable program stored on the memory and executable by the processor, where when the processor, when executing the computer-readable program, are implements the steps of the method as described above.

The present application further provides a computer-readable storage medium having a computer-readable program stored thereon, where the computer-readable program, when executed by a processor, implements the steps of the method as described above.

The beneficial effects of the above technical solutions are as follows.

In this technical solution, when a service request sent by a client computing device is received, it may be queried whether there is service data corresponding to the service request in a buffer unit, and if there is service data corresponding to the service request in the buffer unit, the corresponding service data in the buffer unit may be directly sent to the client computing device to reduce visit pressure on a second service layer. Also, the obtained service request may be analyzed to identify whether the service request is within a normal range (for example, a request frequency is greater than a frequency threshold); and when a request frequency of the service request is greater than the frequency threshold, it may be considered that the second service layer (a primary service server) of a service type corresponding to the service request has reached an upper limit of capacity, and the service request needs to be sent to a first service layer (a secondary service server) to obtain corresponding service data, thereby alleviating the visit pressure on the second service layer, improving the efficiency of dealing with burst traffic, and ensuring the user experience in watching a live broadcast.

DETAILED DESCRIPTION OF EMBODIMENTS

Figure 1:
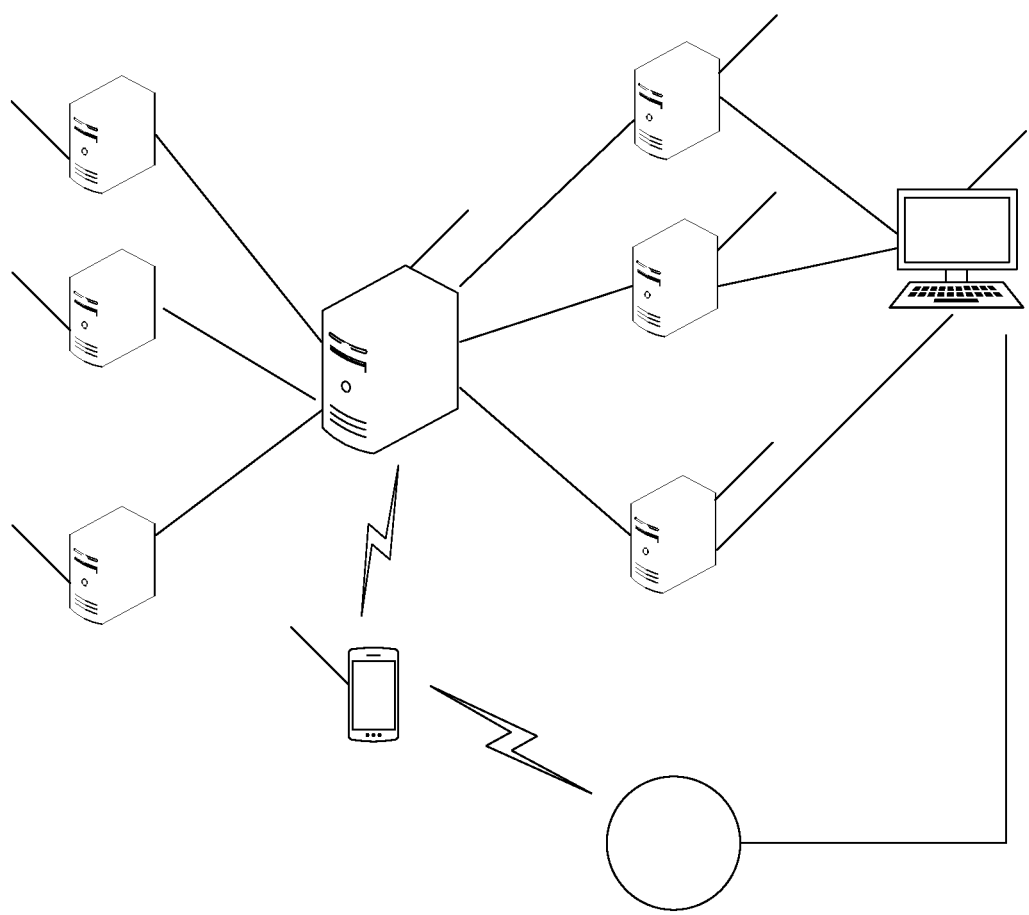
FIG. 1 is an architecture diagram of an embodiment of a system for processing burst traffic according to the present application.

Advantages of the present application will be further described below in conjunction with the accompanying drawings and details of the embodiments.

Exemplary embodiments will be described in detail herein, and examples thereof are shown in the accompanying drawings. When the following descriptions involve the accompanying drawings, the same numerals in different drawings refer to the same or similar elements unless otherwise indicated. The implementations described in the following exemplary embodiments do not represent all implementations consistent with the present application. Rather, they are merely examples of apparatuses and methods consistent with some aspects of the present application as detailed in the appended claims.

The terms used in the present application are only for the purpose of describing particular embodiments, and are not intended to limit the present application. The terms "a/an", "said" and "the" in the singular form used in the present application and the appended claims are also intended to include plural forms unless otherwise clearly indicated in the context. It should also be understood that the term "and/or" as used herein refers to and includes any or all possible combinations of one or more associated listed items.

It should be understood that although the terms first, second, third, etc. may be used in the present application to describe various information, the information should not be limited to these terms. These terms are only used to distinguish the same type of information from each other. For example, the first information may also be referred to as second information, and similarly, the second information may also be referred to as first information without departing from the scope of the present application. Depending on the context, the word "if" as used herein may be interpreted as "when" or "upon" or "in response to determining".

In the description of the present application, it should be understood that the reference numbers before the steps do not identify the sequence of execution of the steps, and are only used to facilitate the description of the present application and distinguish each step, and therefore cannot be understood as a limitation on the present application.

A video in the embodiments of the present application may be presented on a large-scale video playback device, a game console, a desktop computer, a smart phone, a tablet computer, a Moving Picture Experts Group Audio Layer III (MP3) player, a Moving Picture Experts Group Audio Layer IV (MP4) player, a laptop computer, an e-book reader and other display terminals.

A method for processing burst traffic in the embodiments of the present application may be applied to live broadcast scenarios. For example, it may be applied to services with a large number of concurrent users such as interactive videos between viewers and live streamers/video broadcasters, and interactive game playback (for example, "Black Mirror" or "The Invisible Guardian" in the field). The embodiments of the present application take the application of a video to a live video as an example, but it is not limited to this.

In the embodiments of the present application, an access server sends corresponding service data to a client computing device after querying a buffer unit according to a service request sent by the client computing device, so as to reduce visit pressure on a primary service server; or. Also, the obtained service request may be analyzed to identify whether the service request is greater than a frequency threshold; and when the request frequency of the service request is greater than the frequency threshold, resources are allocated to a secondary service server according to a service type of the service request. The service request is sent to the secondary service server to obtain corresponding service data, and the service data is fed back to the client computing device, thereby alleviating the visit pressure on the primary service server, and improving the efficiency of dealing with burst traffic. As shown in FIG. 1, a user A visits a live broadcast room and sends a prop service request to an access server W through a wireless network, and at the same time sends a video request to a CDN node. The CDN node obtains video data from a corresponding video server according to the received video request, and feeds the video data back to the user A. A monitoring terminal G monitors in real time popularity data of each live broadcast room accessed by the CDN node, and obtains a current access status of each live broadcast room. If the popularity data is greater than a preset popularity threshold, the monitoring terminal G may enable a service server Q to mark prop service data associated with the live broadcast room. Upon receiving the prop service request, the access server W traverses its buffer unit to query whether there is service data matching the prop service request. If there is service data matching the prop service request, the access server W sends the service data to the user A, to reduce visit pressure on the primary service server. If there is no service data matching the prop service request, the access server W determines whether a request frequency of the prop service request is greater than the frequency threshold, and if the request frequency is greater than the frequency threshold, the access server sends the prop service request to a service server M in the secondary service server to obtain corresponding prop service data, and feed the prop service data back to the user A, thereby alleviating the visit pressure on the primary service server (service server Q), and improving the efficiency of dealing with burst traffic, so as to ensure the user experience in watching the live broadcast. Here, only one access server W and one user A are described here, while the application scenario here may also include a plurality of independent access servers W and a plurality of users A. The access server W may be a cloud server or a local server. The device of the user A is not limited to a mobile device shown in the figure, and all smart terminals that can upload videos are applicable.

Figure 2:
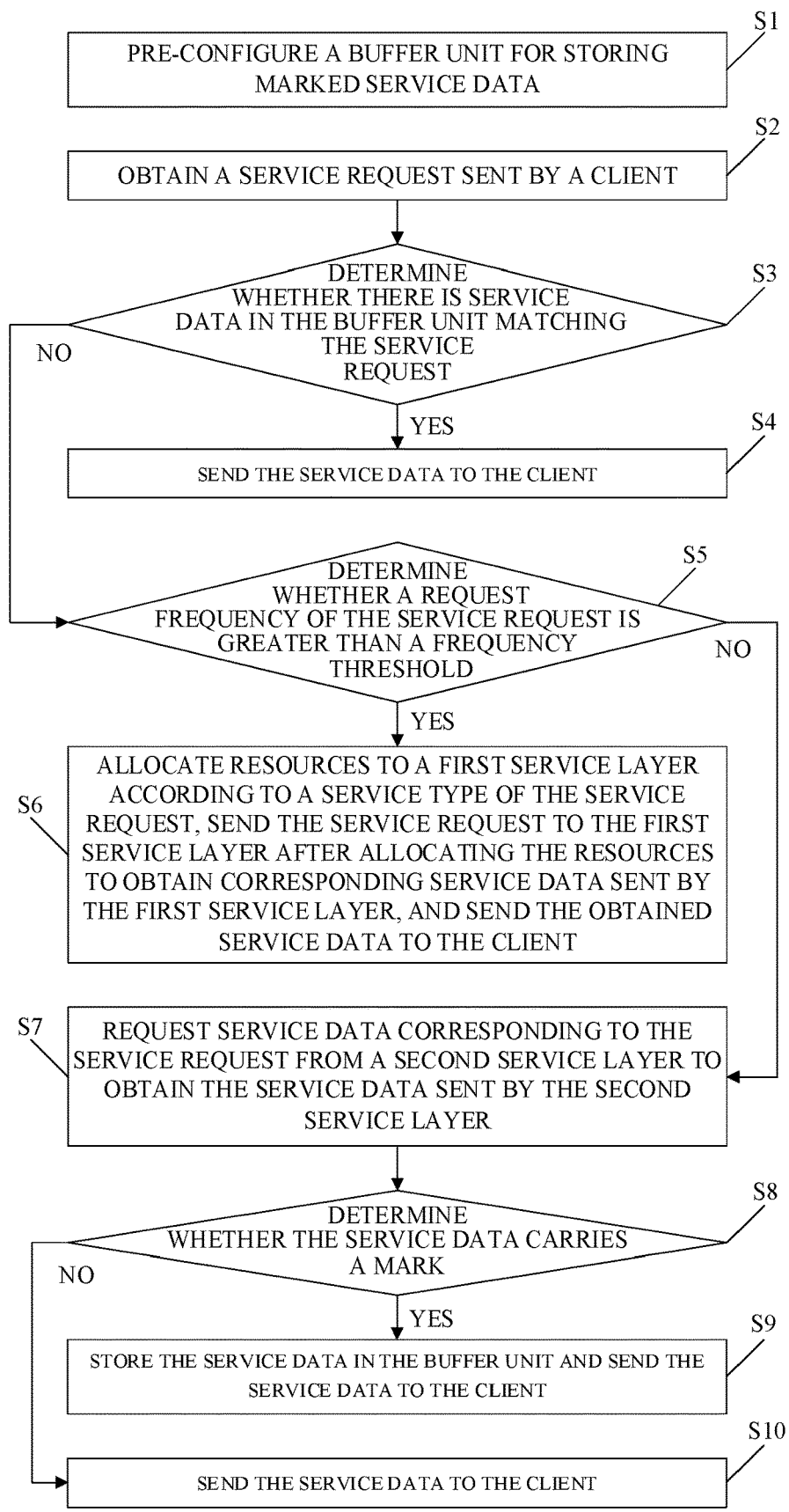
FIG. 2 is a flowchart of an embodiment of a method for processing burst traffic according to the present application.

In order to overcome the shortcomings of traffic limiting and degradation caused by instantaneous burst traffic, the present application proposes a method for processing burst traffic that can offload and buffer burst traffic to avoid traffic limiting and degradation. With reference to FIG. 2, which is a schematic flowchart of a method for processing burst traffic according to a preferred embodiment of the present application, the method for processing burst traffic provided in this embodiment is provided with a buffer unit configured for storing marked service data. It should be noted that: the buffer unit may be a buffer server, or may be storage space inside the access server. The method for processing burst traffic mainly includes the following steps:

S1, pre-configuring a buffer unit for storing marked service data.

In practical applications, the method for processing burst traffic may be applied to the access server of an access layer. In this step, the buffer unit may be pre-configured in the access server.

S2, obtaining a service request sent by a client computing device.

In this embodiment, before step S2 is performed to obtain the service request sent by the client computing device, the method may further include:

X, monitoring popularity data of a live broadcast room and marking service data with popularity data greater than a preset popularity threshold by a second service layer.

Here, the popularity data refers to data that can characterize the number of viewers currently watching a live broadcast in the live broadcast room. Optionally, the popularity data is the current number of online users in the live broadcast room. The number of online users may be obtained through a pull-stream address. That is, the number of users who currently download and watch videos through the corresponding live pull-stream address of the live broadcast room is used as a data source of the number of online users.

By way of example and without any limitation, a monitoring terminal may be used to monitor the popularity data of the live broadcast room, and the monitoring terminal may be a monitoring server.

In this step, the step of monitoring popularity data of a live broadcast room, and marking, by a second service layer, service data with popularity data greater than a preset popularity threshold (for example: the preset popularity threshold may be set periodically/dynamically based on historical/dynamic data of the number of online viewers of the live broadcast on the website, and the threshold may also be used as an evaluation standard for popular live broadcast rooms, or may be set directly based on values of the popular live broadcast rooms, where the popular live broadcast rooms are all live broadcast rooms with a high number of online users) includes:

obtaining the popularity data of each live broadcast room by monitoring popularity data of each live broadcast room accessed by each content delivery network (CDN) node, and determining whether the popularity data of the live broadcast room is greater than the preset popularity threshold.

In practical applications, one monitoring terminal may correspond to one CDN node, or one monitoring terminal may correspond to a plurality of CDN nodes. A CDN node is mainly used for video distribution, and while distributing a video, the CDN node can also count the number of users who are downloading and watching a video through the corresponding live pull-stream address of each live broadcast room, such as the number of online users in the live broadcast room.

In this embodiment, by monitoring the CDN node, the popularity data of each live broadcast room accessed by the CDN node is thereby obtained, so as to monitor in real time whether the popularity data of each live broadcast room reaches the threshold.

When the popularity data of the live broadcast room is less than or equal to the preset popularity threshold, the method returns to perform step X; and when the popularity data of the live broadcast room is greater than the preset popularity threshold, the method includes sending an address of the live broadcast room to the second service layer and marking the service data associated with the address of the live broadcast room by the second service layer.

Further, when the popularity data of the live broadcast room is greater than the preset popularity threshold, the address of the live broadcast room is sent to the second service layer and the service data associated with the address of the live broadcast room is marked by the second service layer.

In practical applications, when the popularity data of the live broadcast room is greater than the preset popularity threshold (for example, a popular live broadcast room), the monitoring terminal may broadcast the address of the live broadcast room to each service server in the second service layer through a message queue. When receiving the address broadcast, the service server marks the service data associated with the address, so as to subsequently identify whether the service data belongs to service data of the popular live broadcast room according to the mark.

Specifically, when the popularity data of the live broadcast room is greater than the preset popularity threshold, the address of the live broadcast room is obtained and the address of the live broadcast room is sent to each service server in the second service layer, and the service data associated with the address of the live broadcast room is marked by the service servers.

By way of example and without any limitation, the service server included in the second service layer may be selected from at least one of the following: a user server, a room server, a prop server, a wallet server, an activity server, etc.

In this embodiment, the prop server may be configured to distribute props (for example, gift props, prize drawing props, rhythm storm props, full-screen animation props, etc.). The user server may be configured to publish information about a live streamer. The wallet server may be configured to purchase and exchange virtual currency, and so on. The activity server may be configured to publish activity information. The room server may be configured to publish following information, live broadcast room information, ranking information, point information, etc.

In S3, whether there is service data in the buffer unit matching the service request is determined. If there is service data in the buffer unit matching the service request, the process proceeds to step S4, and if there is no service data in the buffer unit matching the service request, the process proceeds to step S5.

It should be noted that: a plurality of access servers may be included, and each access server communicates with a service server group.

In S4, the service data to the client computing device is sent.

In S5, whether a request frequency of the service request is greater than the frequency threshold is determined. If the request frequency of the service request is greater than the frequency threshold, the process proceeds to step S6, and if the request frequency of the service request is not greater than the frequency threshold, the process proceeds to step S7.

In S6, resources are allocated to a first service layer according to a service type of the service request, the service request is sent to the first service layer after the resource allocation, to obtain corresponding service data sent by the first service layer, and the obtained service data is sent to the client computing device.

Figure 3:
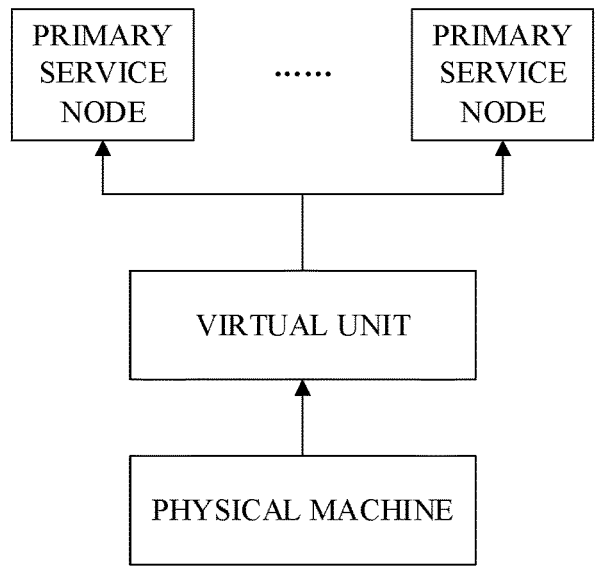
FIG. 3 is an internal schematic diagram of a primary service server.
Figure 4:
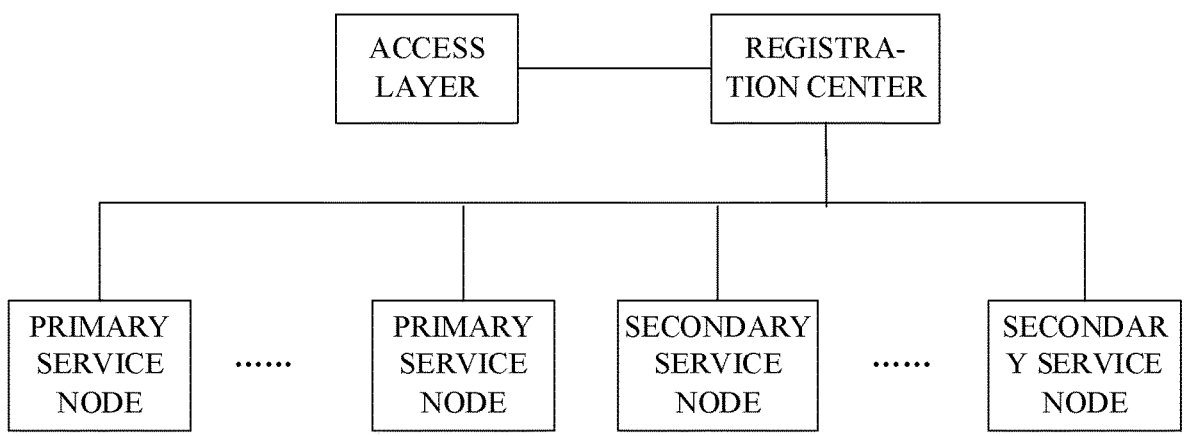
FIG. 4 is a schematic diagram of an embodiment in which an access server obtains a list of registered addresses.

It should be noted that the first service layer is different from the second service layer, and the second service layer stores service resources in an exclusive manner, so that there will be no impact between one service server and another service server due to resource competition. The second service layer may include a plurality of primary service servers. Each primary service server may deploy a plurality of physical machines (referring to FIG. 3). Each physical machine may virtualize a plurality of primary service nodes through a virtual unit (Docker). Each primary service node may register its Internet Protocol (IP) address in a registration center in groups to generate a list of registered addresses. An access layer may obtain the list of registered addresses by requesting an IP address of a primary service node from the registration center (referring to FIG. 4).

Figure 5:
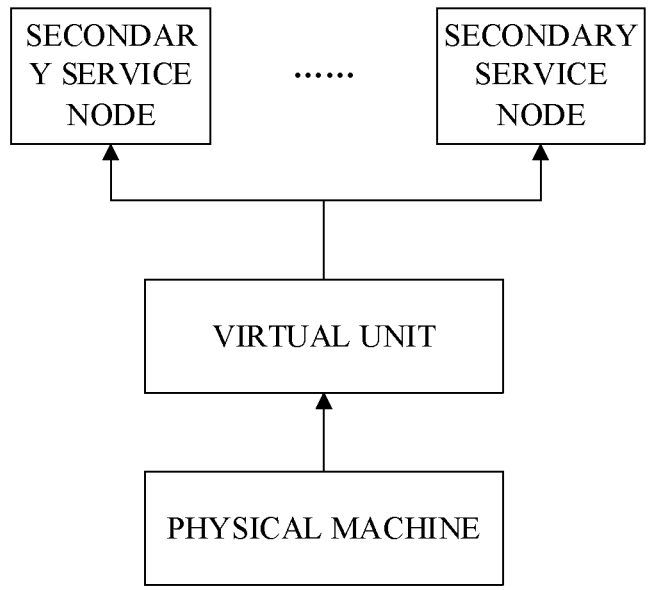
FIG. 5 is an internal schematic diagram of a secondary service server.

The first service layer shares and stores service resources by sharing storage. Resources in the first service layer are not limited, a service resource pool is adjustable, and there may be competition between a service server and another service server. The first service layer may include a plurality of secondary service servers. Each secondary service server may deploy a plurality of physical machines (referring to FIG. 5). Each physical machine may virtualize a plurality of secondary service nodes through a virtual unit (Docker). Each secondary service node may register its Internet Protocol (IP) address in a registration center in groups to generate a list of registered addresses. The access layer may obtain the list of registered addresses by requesting an IP address of a secondary service node from the registration center (referring to FIG. 4).

Figure 6:
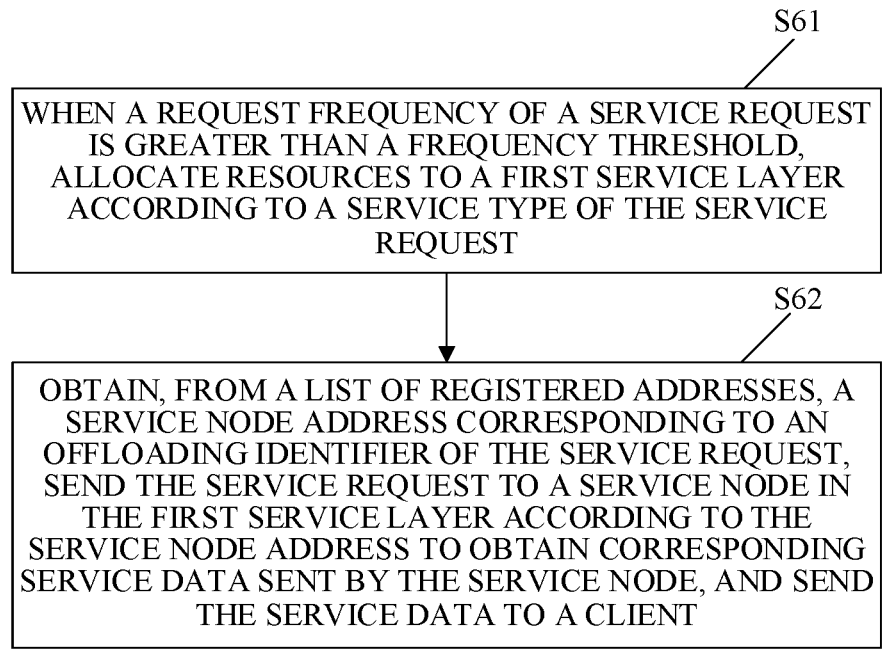
FIG. 6 is a flowchart of another embodiment of a method for processing burst traffic according to the present application.

As shown in FIG. 6, in step S6, the method may include the following steps of:

S61, when the request frequency of the service request is greater than the frequency threshold, allocating resources to the first service layer according to the service type of the service request.

By way of example and without any limitation, the service type is selected from at least one of the following: a user service type, a room service type, a prop service type, a wallet service type, and an activity service type.

Figure 7:
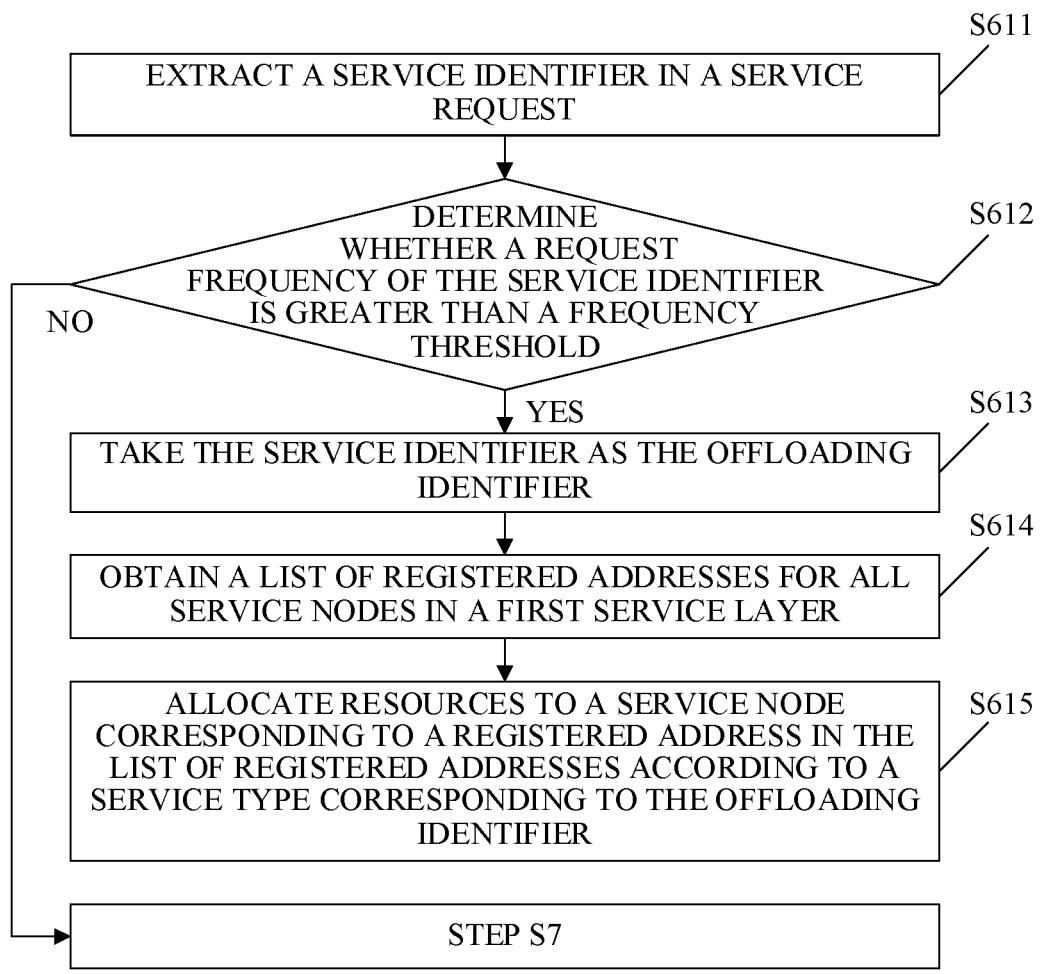
FIG. 7 is a flowchart of another embodiment of a method for processing burst traffic according to the present application.

As shown in FIG. 7, specifically, step S61 includes the following steps of:

S611, extracting a service identifier in the service request.

S612, determining whether the request frequency of the service identifier is greater than the frequency threshold. If the request frequency of the service identifier is greater than the frequency threshold, the process proceeds to step S613, and if the request frequency of the service identifier is not greater than the frequency threshold, the process proceeds to step S7.

Here, the request frequency is a query per second (QPS).

In practical applications, the current QPS of the service identifier may be obtained based on a memory count of the access server.

In S613, the service identifier is taken as an offloading identifier.

In S614, a list of registered addresses for all service nodes in the first service layer is obtained.

In practical applications, the access server may obtain a list of registered addresses of the service nodes in the second service layer and the first service layer through the registration center.

In S615, resources are allocated to a service node corresponding to a registered address in the list of registered addresses according to a service type corresponding to the offloading identifier. The process proceeds to step S62.

Further, step S615 includes:

obtaining the number of service types corresponding to the offloading identifier; and evenly allocating resources to service nodes with registered addresses in the list of registered addresses according to the number of service types and the corresponding service types.

In this step, if there is only one service type for the offloading identifier that currently exceeds the frequency threshold, resources for the service type may be configured for all service nodes with registered addresses in the list of registered addresses in the first service layer according to the service type, and if there are a plurality of service types for the offloading identifier that currently exceed the frequency threshold, resources may be evenly allocated to the service nodes of the registered addresses in the list of registered addresses according to the service types.

In this embodiment, the access server analyzes the service request sent by the client computing device, obtains the service identifier in the service request, and determines whether it exceeds the frequency threshold according to the QPS of the service identifier. When the service identifier is greater than the frequency threshold, it indicates that the service type corresponding to the service request is currently at an upper limit of capacity in the second service layer, and the service request needs to be sent to the first service layer to alleviate the visit pressure on the second service layer.

In S62, a service node address corresponding to an offloading identifier of the service request is obtained from a list of registered addresses, the service request is sent to a service node in the first service layer according to the service node address, to obtain corresponding service data sent by the service node, and the service data is sent to the client computing device.

In this step, the service request may be sent to the first service layer by using the access server to obtain the corresponding service data, thereby alleviating the visit pressure on the second service layer, and improving the efficiency of dealing with burst traffic, so as to ensure the user experience in watching the live broadcast.

In S7, service data corresponding to the service request is requested from the second service layer, to obtain the service data sent by the second service layer.

In practical applications, the service request may be sent to a corresponding service server in the second service layer through the access server according to a service server address requested in the service request. The service server analyzes the service request. For all service data associated with the service request, if part of the service data is not in the service server, the part of the service data is extracted from other service servers. Then all the obtained service data is aggregated, and the aggregated service data is sent to the access server.

In S8, whether the service data carries a mark is determined. If the service data carries a mark, the process proceeds to step S9, and if the service data does not carry a mark, the process proceeds to step S10.

In S9, the service data is stored in the buffer unit and sent to the client computing device.

In S10, the service data is sent to the client computing device.

In this embodiment, when the client computing device sends a service request to the access server, the access server may be used to query whether there is service data corresponding to the service request in a buffer unit. If there is service data corresponding to the service request in the buffer unit, the corresponding service data in the buffer unit may be directly sent to the client computing device to reduce visit pressure on a second service layer. Also, the obtained service request may be analyzed to identify whether the service request is within a normal range (for example, a request frequency is greater than a frequency threshold). When a request frequency of the service request is greater than a frequency threshold, it may be considered that a service server (the second service layer) of a service type corresponding to the service request has reached an upper limit of capacity, and the service request needs to be sent to the first service layer to obtain corresponding service data, thereby alleviating the visit pressure on the second service layer, improving the efficiency of dealing with burst traffic, and ensuring the user experience in watching a live broadcast.

In practical applications, the client computing device may separately send a service request to the access server and a video request to the CDN node at the same time, or only send a service request to the access server. When the client computing device separately sends a service request to the access server and a video request to the CDN node at the same time, the CDN node obtains video data from a corresponding video server according to the received video request, and feeds the video data back to the corresponding client computing device so that the client computing device can watch the video data of the live broadcast. When receiving a service request, the access server queries whether its buffer unit stores the service data corresponding to the service request. If the buffer unit stores the service data corresponding to the service request, the corresponding service data in the buffer unit may be directly sent to the client computing device to reduce visit pressure on a second service layer, or if the buffer unit does not store the service data corresponding to the service request, the obtained service request may be analyzed to identify whether the request frequency of the service request is greater than the frequency threshold. If the request frequency of the service request is greater than the frequency threshold, it may be considered that the service server (the second service layer) of a service type corresponding to the service request has reached an upper limit of capacity, and the service request needs to be sent to a first service layer to obtain corresponding service data, thereby alleviating the visit pressure on the second service layer, improving the efficiency of dealing with burst traffic, and ensuring the user experience in watching a live broadcast.

Figure 8:
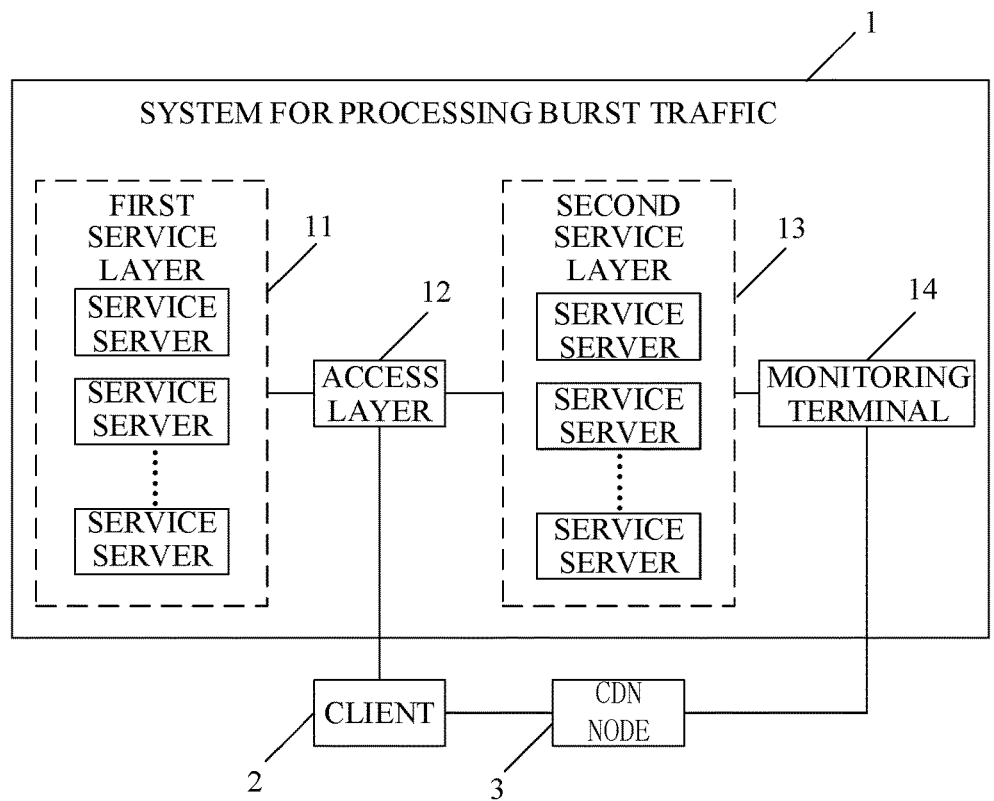
FIG. 8 is a diagram of means of an embodiment of a system for processing burst traffic according to the present application.

As shown in FIG. 8, a system for processing burst traffic 1 includes: a monitoring terminal 14, an access layer 12, a second service layer 13, and a first service layer 11. Herein:

a buffer unit for storing marked service data may be provided in the access layer 12;

the first service layer 11 shares and stores service resources by sharing storage;

the access layer 12 is configured to obtain a service request sent by a client computing device 2;

the access layer 12 queries whether there is service data in the buffer unit matching the service request;

when there is service data in the buffer unit matching the service request, the access layer 12 sends the service data to the client computing device 2;

when there is no service data stored in the buffer unit matching the service request, the access layer 12 determines whether a request frequency of the service request is greater than a frequency threshold; and the access layer 12 allocates, when the request frequency of the service request is greater than the frequency threshold, resources to a first service layer 11 according to a service type of the service request, and sends the service request to the first service layer 11, to obtain corresponding service data sent by the first service layer 11, and the access layer 12 sends the obtained service data to the client computing device 2.

The monitoring terminal 14 is configured to monitor popularity data of each live broadcast room, so that the second service layer 13 marks service data with popularity data greater than a preset popularity threshold.

Here, the popularity data refers to data that can characterize the number of viewers currently watching a live broadcast in the live broadcast room. Optionally, the popularity data is the current number of online users in the live broadcast room. The number of online users may be obtained through a pull-stream address, that is, the number of users who currently download and watch videos through the corresponding live pull-stream address of the live broadcast room is used as a data source of the number of online users.

The monitoring terminal 14 obtains the popularity data of each live broadcast room by monitoring the popularity data of each live broadcast room accessed by each CDN node 3, and determines whether the popularity data of the live broadcast room is greater than the preset popularity threshold.

In practical applications: one monitoring terminal may correspond to one CDN node, or one monitoring terminal may correspond to a plurality of CDN nodes. A CDN node is mainly used for video distribution, and while distributing a video, the CDN node can also count the number of users who are downloading and watching a video corresponding to a live pull-stream address of each live broadcast room, such as the number of online users in the live broadcast room.

When the request frequency of the service request is less than or equal to the frequency threshold, the access layer 12 requests service data corresponding to the service request from the second service layer 13, to obtain the service data.

The access layer 12 is further configured to determine whether the service data carries a mark. If the service data carries a mark, the service data is stored in the buffer unit and the service data is sent to the client computing device 2, and if the service data does not carry a mark, the service data is sent to the client computing device 2.

Figure 9:
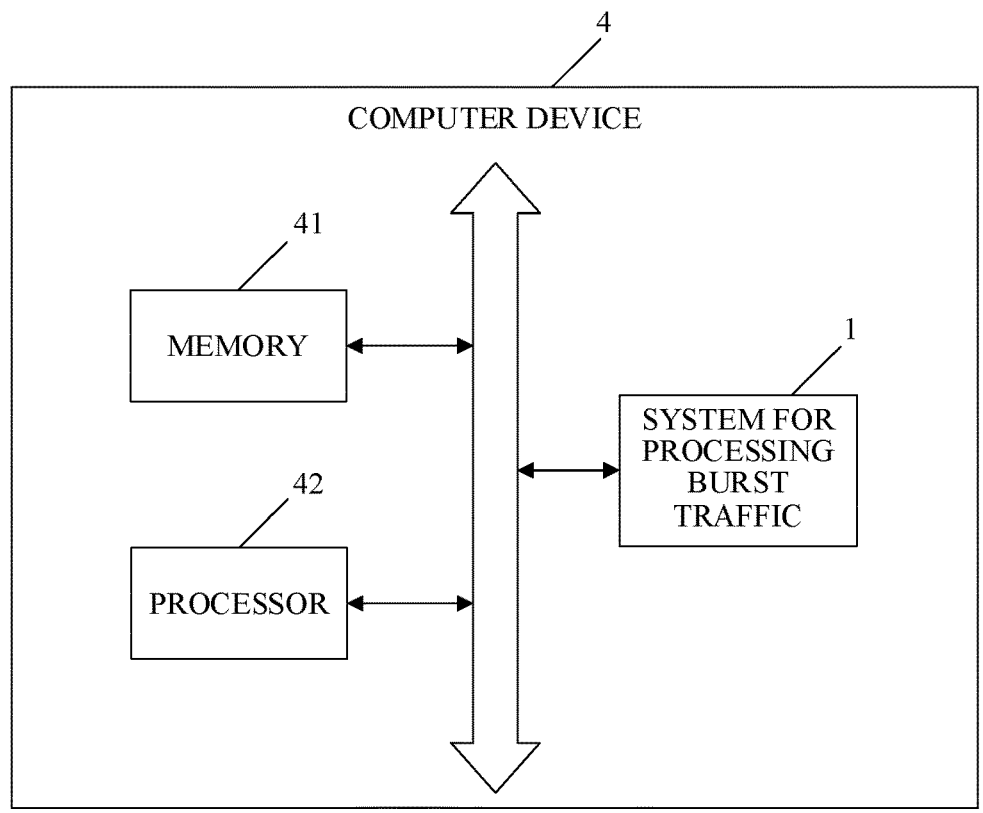
FIG. 9 is a hardware architecture diagram of an embodiment of a computer device according to the present application.

As shown in FIG. 9, a computer device 4 is provided. The computer device 4 includes:

a memory 41 configured to store executable program codes; and a processor 41 configured to call the executable program codes in the memory 41, and the execution steps include the above method for processing burst traffic.

In FIG. 7, there being one processor 41 is taken as an example.

As a non-volatile computer-readable storage medium, the memory 41 may be configured to store non-volatile software programs, non-volatile computer-executable programs and means, such as program instructions/means corresponding to the method for processing burst traffic in the embodiments of the present application. The processor 41 executes various functional applications and data processing of the computer device 4, that is, implements the method for processing burst traffic in the foregoing method embodiments, by running non-volatile software programs, instructions, and means stored in the memory 41.

The memory 41 may include a program storage area and a data storage area, where the program storage area may store an operating system and an application program required by at least one function; and the data storage area may store playback information of a user in the computer device 4. In addition, the memory 41 may include a high-speed random access memory, and may also include a non-volatile memory, such as at least one magnetic disk storage device, a flash memory device, or other non-volatile solid-state storage devices. In some embodiments, the memory 41 may optionally include memories 41 disposed remotely relative to the processor 41, and these remote memories 41 may be connected to the system for processing burst traffic 1 through a network. Instances of the above network include, but are not limited to, the Internet, an enterprise intranet, a local area network, a mobile communication network, and a combination thereof.

The one or more means are stored in the memory 41, and when executed by the one or more processors 41, execute the method for processing burst traffic in any of the foregoing method embodiments.

The above products can execute the methods provided in the embodiments of the present application, and have functional means and beneficial effects corresponding to the execution of the methods. For technical details not described in detail in this embodiment, reference can be made to the methods provided in the embodiments of the present application.

The computer device 4 in the embodiment of the present application exists in various forms, including but not limited to:

(1) Mobile communication device: such a device is characterized by mobile communication functions, and its main goal is to provide voice and data communications. Such a terminal includes: a smart phone (such as iPhone), a multimedia phone, a functional phone, and a low-end phone.

(2) Ultra-mobile personal computer device: such a device belongs to the category of personal computers, has calculation and processing functions, and generally also has mobile Internet access features. Such a terminal includes: a PDA device, a MID device, and a UMPC device, such as iPad.

(3) Portable entertainment device: such a device can display and play multimedia content. Such a device includes: an audio player, a video player (such as iPod), a handheld game console, an e-book, as well as an intelligent toy and a portable vehicle navigation device.

(4) Server: a device that provides computing services. The server includes a processor, a hard disk, a memory, a system bus, etc. The architecture of server is similar to that of a general computer, but because the server needs to provide highly reliable services, there are high requirements on the server in terms of processing capacity, stability, reliability, security, scalability, and manageability.

(5) Other electronic apparatuses with data exchange functions.

An embodiment of the present application provides a non-volatile computer-readable storage medium, the computer-readable storage medium stores computer-executable instructions, and the computer-executable instructions are executed by one or more processors, such as one processor 41 in FIG. 7, can enable the above one or more processors 41 to perform the following steps:

pre-configuring a buffer unit for storing marked service data;

obtaining a service request sent by a client computing device;

determining whether there is service data stored in the buffer unit matching the service request;

when there is service data in the buffer unit matching the service request, sending the service data to the client computing device;

when there is no service data in the buffer unit matching the service request, determining whether a request frequency of the service request is greater than a frequency threshold; and allocating, when the request frequency of the service request is greater than the frequency threshold, resources to a first service layer according to a service type of the service request, sending the service request to the first service layer after the resource allocation, to obtain corresponding service data sent by the first service layer, and sending the obtained service data to the client computing device.

The apparatus embodiments described above are merely illustrative. The units described as separate components may or may not be physically separated, and the components displayed as units may or may not be physical units, that is, they may be located in one place, or may be distributed on at least two network units. Some or all of the means may be selected according to actual needs to achieve the objectives of the solutions of the embodiments of the present application. Those of ordinary skill in the art can understand and implement the solutions without any creative effort.

Through the description of the above implementations, those of ordinary skill in the art can clearly understand that each implementation can be implemented by software plus a general hardware platform, and certainly, it can also be implemented by hardware. Those of ordinary skill in the art can understand that all or some of the processes in the methods of the foregoing embodiments can be implemented by a computer-readable program to instruct relevant hardware. The program described can be stored in a computer-readable storage medium. When the program is executed, the flow of the embodiments of the above methods can be included. Here, the storage medium may be a magnetic disk, an optical disc, a Read-Only Memory (ROM), or a Random Access Memory (RAM), and so on.

Embodiment 1

As shown in FIG. 1, a monitoring terminal G monitors in real time popularity data of a live broadcast room with a room number 001 accessed by a CDN node. If the popularity data of the room number 001 is greater than a preset popularity threshold, the monitoring terminal G may control a second service layer (service server Q) to mark all service data associated with the live broadcast room with the room number 001. When a user A sends a prop service request to an access server W and at the same time sends a video request for the live broadcast room with the room number 001 to the CDN node, the CDN node obtains video data from a corresponding video server according to the received video request, and feeds the video data back to the user A. The access server W queries its buffer unit upon receiving the prop service request sent by the user A, and no service data matching the prop service request is found in the buffer unit. Then, the access server W analyzes the prop service request, and identifies that a query per second of a prop service corresponding to the prop service request is greater than a frequency threshold. The access server W allocates resources to a first service layer (service server M) according to a service type of the prop service request, and sends the prop service request to the first service layer after the resource allocation. After the first service layer receives the prop service request, prop service data corresponding to the prop service request is obtained, and the prop service data is sent to the access server W, and the access server W feeds back the prop service data to the user A.

Embodiment 2

As shown in FIG. 1, a monitoring terminal G monitors in real time popularity data of a live broadcast room with a room number 001 accessed by a CDN node. If the popularity data of the room number 001 is greater than a preset popularity threshold, the monitoring terminal G may control a second service layer (service server Q) to mark all service data associated with the live broadcast room with the room number 001. When a user A sends a prop service request to an access server W and at the same time sends a video request for the live broadcast room with the room number 001 to the CDN node, the CDN node obtains video data from a corresponding video server according to the received video request, and feeds the video data back to the user A. The access server W queries its buffer unit upon receiving the prop service request sent by the user A, and no service data matching the prop service request is found in the buffer unit. The access server W analyzes the prop service request, identifies that a query per second of a prop service corresponding to the prop service request is less than a frequency threshold, and sends the prop service request to the second service layer (service server Q). After the second service layer receives the prop service request, prop service data corresponding to the prop service request is obtained, and the prop service data is sent to the access server W, and the access server W feeds back the prop service data to the user A.

The above descriptions are only preferred embodiments of the present application, and do not limit the implementation and protection scope of the present application. Those skilled in the art should be able to realize that solutions obtained through all equivalent substitutions and obvious changes made by using the content of the description and accompanying drawings of the present application shall be included in the protection scope of the present application.

The invention claimed is:

1. A method for processing burst traffic, comprising:
pre-configuring a buffer unit for storing marked service data;
obtaining a service request sent by a client computing device;
determining whether there is service data stored in the buffer unit matching the service request;
in response to determining that there is service data in the buffer unit matching the service request, sending the service data to the client computing device;

in response to determining that there is no service data in the buffer unit matching the service request, determining whether a request frequency associated with the service request is greater than a frequency threshold;

in response to determining that the request frequency is greater than the frequency threshold, allocating resources to a first service layer based on a service type of the service request, wherein the allocating resources to a first service layer based on a service type of the service request in response to determining that the request frequency is greater than the frequency threshold further comprises:

extracting a service identifier from the service request, determining whether the request frequency associated with the service identifier is greater than the frequency threshold, in response to determining that the request frequency associated with the service identifier is greater than the frequency threshold, identifying the service identifier as the offloading identifier, obtaining a list of registered addresses for all service nodes in the first service layer, and allocating the resources to a service node corresponding to a registered address in the list of registered addresses based on the service type corresponding to the offloading identifier;

sending the service request to the first service layer after allocating the resources to the first service layer, and obtaining corresponding service data from the first service layer; and sending the obtained corresponding service data to the client computing device.

2. The method for processing burst traffic according to claim 1, wherein the first service layer shares service resources by sharing storage.

3. The method for processing burst traffic according to claim 1, wherein before the obtaining a service request sent by the client computing device, the method comprises:

monitoring popularity data associated with a live broadcast room; and marking service data associated with the live broadcast room by a second service layer in response to determining that the popularity data is greater than a predetermined popularity threshold.

4. The method for processing burst traffic according to claim 3, further comprising:

in response to determining that the request frequency of the service request is less than or equal to the frequency threshold, requesting service data corresponding to the service request from the second service layer and obtaining the service data from the second service layer;

determining whether the service data carries a mark;

in response to determining that the service data carries the mark, storing the service data in the buffer unit and sending the service data to the client computing device; and in response to determining that the service data does not carry the mark, sending the service data to the client computing device.

5. The method for processing burst traffic according to claim 3, wherein the monitoring popularity data associated with a live broadcast room and marking the service data by a second service layer comprises:

monitoring popularity data associated with each live broadcast room accessed by each content delivery network (CDN) node, and determining whether the popularity data associated with each live broadcast room is greater than the predetermined popularity threshold;

sending an address of at least one live broadcast room to the second service layer in response to determining that the popularity data associated with the at least one live broadcast room is greater than the predetermined popularity threshold; and marking service data associated with the address of the at least one live broadcast room by the second service layer.

6. The method for processing burst traffic according to claim 5, further comprising:

in response to determining the popularity data associated with the at least one live broadcast room is greater than the predetermined popularity threshold, obtaining the address of the at least one live broadcast room;

sending the address of the at least one live broadcast room to each service server in the second service layer; and marking the service data associated with the address of the at least one live broadcast room by each service server.

7. The method for processing burst traffic according to claim 1, further comprising:

allocating the resources to the first service layer based on the service type of the service request in response to determining that the request frequency associated with the service request is greater than the frequency threshold;

obtaining, from a list of registered addresses, a service node address corresponding to an offloading identifier associated with the service request;

sending the service request to a service node in the first service layer according to the service node address, and obtaining corresponding service data sent by the service node; and sending the obtained corresponding service data to the client computing device.

8. A computing device comprising a memory, a processor, and a computer-readable program stored on the memory and executable by the processor, wherein the computer-readable instructions, when executed by the processor, implement operations comprising:

pre-configuring a buffer unit for storing marked service data;

obtaining a service request sent by a client computing device;

determining whether there is service data stored in the buffer unit matching the service request;

in response to determining that there is service data in the buffer unit matching the service request, sending the service data to the client computing device;

in response to determining that there is no service data in the buffer unit matching the service request, determining whether a request frequency associated with the service request is greater than a frequency threshold;

in response to determining that the request frequency is greater than the frequency threshold, allocating resources to a first service layer based on a service type of the service request;

sending the service request to the first service layer after the allocating resources to the first service layer, and obtaining corresponding service data from the first service layer;

sending the obtained corresponding service data to the client computing device;

wherein the operations further comprise:
extracting a service identifier from the service request
determining whether the request frequency associated with the service identifier is greater than the frequency threshold;
in response to determining that the request frequency associated with the service identifier is greater than the frequency threshold, identifying the service identifier as the offloading identifier;
obtaining a list of registered addresses for all service nodes in the first service layer; and
allocating the resources to a service node corresponding to a registered address in the list of registered addresses based on the service type corresponding to the offloading identifier.

9. The computing device according to claim 8, wherein the first service layer shares service resources by sharing storage.

10. The computing device according to claim 8, wherein the computer-readable instructions, when executed by the processor, further implement operations of:
monitoring popularity data associated with a live broadcast room; and
marking service data associated with the live broadcast room by a second service layer in response to determining that the popularity data is greater than a predetermined popularity threshold.

11. The computing device according to claim 10, wherein the computer-readable instructions, when executed by the processor, further implement operations of:
in response to determining that the request frequency of the service request is less than or equal to the frequency threshold, requesting service data corresponding to the service request from the second service layer and obtaining the service data from the second service layer;
determining whether the service data carries a mark;
in response to determining that the service data carries the mark, storing the service data in the buffer unit and sending the service data to the client computing device; and
in response to determining that the service data does not carry the mark, sending the service data to the client computing device.

12. The computing device according to claim 10, wherein the computer-readable instructions, when executed by the processor, further implement operations of:
monitoring popularity data associated with each live broadcast room accessed by each content delivery network (CDN) node, and determining whether the popularity data associated with each live broadcast room is greater than the predetermined popularity threshold;
sending an address of at least one live broadcast room to the second service layer in response to determining that the popularity data associated with the at least one live broadcast room is greater than the predetermined popularity threshold; and
marking service data associated with the address of the at least one live broadcast room by the second service layer.

13. The computing device according to claim 12, wherein the computer-readable instructions, when executed by the processor, further implement operations of:
in response to determining the popularity data associated with the at least one live broadcast room is greater than the predetermined popularity threshold, obtaining the address of the at least one live broadcast room;
sending the address of the at least one live broadcast room to each service server in the second service layer; and
marking the service data associated with the address of the at least one live broadcast room by each service server.

14. The computing device according to claim 8, wherein the computer-readable instructions, when executed by the processor, further implement operations of:
allocating the resources to the first service layer based on the service type of the service request in response to determining that the request frequency associated with the service request is greater than the frequency threshold;
obtaining, from a list of registered addresses, a service node address corresponding to an offloading identifier associated with the service request;
sending the service request to a service node in the first service layer according to the service node address, and obtaining corresponding service data sent by the service node; and
sending the obtained corresponding service data to the client computing device.

15. A non-transitory computer-readable storage medium having a computer-readable program stored thereon, wherein the computer-readable program, when executed by a processor, implements operations of:
pre-configuring a buffer unit for storing marked service data;
obtaining a service request sent by a client computing device;
determining whether there is service data stored in the buffer unit matching the service request;
in response to determining that there is service data in the buffer unit matching the service request, sending the service data to the client computing device;
in response to determining that there is no service data in the buffer unit matching the service request, determining whether a request frequency associated with the service request is greater than a frequency threshold;
in response to determining that the request frequency is greater than the frequency threshold, allocating resources to a first service layer based on a service type of the service request, wherein the allocating resources to a first service layer based on a service type of the service request further comprises:
extracting a service identifier from the service request,
determining whether the request frequency associated with the service identifier is greater than the frequency threshold,
in response to determining that the request frequency associated with the service identifier is greater than the frequency threshold, identifying the service identifier as the offloading identifier,
obtaining a list of registered addresses for all service nodes in the first service layer, and
allocating the resources to a service node corresponding to a registered address in the list of registered addresses based on the service type corresponding to the offloading identifier;
sending the service request to the first service layer after the allocating resources to the first service layer, and obtaining corresponding service data from the first service layer; and
sending the obtained corresponding service data to the client computing device.

16. The non-transitory computer-readable storage medium according to claim 15, wherein the computer-readable program, when executed by the processor, further implements operations of:
- monitoring popularity data associated with a live broadcast room; and
- marking service data associated with the live broadcast room by a second service layer in response to determining that the popularity data is greater than a pre-determined popularity threshold.

17. The non-transitory computer-readable storage medium according to claim 16, wherein the computer-readable program, when executed by the processor, further implements operations of:
- in response to determining that the request frequency of the service request is less than or equal to the frequency threshold, requesting service data corresponding to the service request from the second service layer and obtaining the service data from the second service layer;
- determining whether the service data carries a mark;
- in response to determining that the service data carries the mark, storing the service data in the buffer unit and sending the service data to the client computing device; and
- in response to determining that the service data does not carry the mark, sending the service data to the client computing device.

\* \* \* \* \*